United States Patent [19]

Hawkins et al.

[11] Patent Number: 4,658,707

[45] Date of Patent: Apr. 21, 1987

[54] AUTOMATIC AIR PURIFIER FOR VEHICLES

[76] Inventors: Vernon F. Hawkins, Rt. 1, Box 212 (Jefferson County), Cedar Hill, Mo. 63016; Willard H. Louks, 4442 Cottage Grove (Jefferson County), House Springs, Mo. 63051

[21] Appl. No.: 781,144

[22] Filed: Sep. 27, 1985

[51] Int. Cl.$^4$ .............................................. B60H 3/06
[52] U.S. Cl. ...................................... 98/2.11; 55/316; 55/467
[58] Field of Search ............... 55/316, 385 B, 385 G, 55/467, 478, 486, 489; 98/2.11, 31.5, 42.03, 2.01

[56] References Cited

U.S. PATENT DOCUMENTS

| | | | |
|---|---|---|---|
| 2,243,637 | 5/1941 | Landis et al. | 55/316 |
| 2,808,237 | 10/1957 | Foshes | 98/31.5 X |
| 3,722,182 | 3/1973 | Gilbertson | 98/2.11 X |
| 3,826,180 | 7/1974 | Hayashi | 98/42.03 |
| 3,860,404 | 1/1975 | Juchimski | 55/467 X |
| 4,064,203 | 12/1977 | Cox | 98/31.5 X |
| 4,119,419 | 10/1978 | Passaro et al. | 55/385 G X |
| 4,154,251 | 5/1979 | Doyel | 55/467 X |
| 4,223,598 | 9/1980 | Suzuki et al. | 98/2.11 |
| 4,245,550 | 1/1981 | Suzuki et al. | 98/2.11 |
| 4,477,270 | 10/1984 | Tauch | 55/316 |

FOREIGN PATENT DOCUMENTS 57021  4/1984  Japan ..................................... 98/2.11

Primary Examiner—Harold Joyce
Attorney, Agent, or Firm—Kalish & Gilster

[57] ABSTRACT

An air purifier of automatic type is provided within a housing which can be positioned within various places in a confined space, such as most preferably a vehicle interior, in which smoke may be present to purify the air therein. The unit includes a housing formed of base and cover portions, and including a filter for filtering of tobacco smoke and other impurities. A fan draws the air through the housing for filtration by the filter of smoke and such impurities. An electric motor drives the fan, and is controlled by a circuit including a smoke detector for causing operation only upon detection of smoke in the air, and most preferably causing operation for a predetermined time interval upon such detection.

7 Claims, 7 Drawing Figures

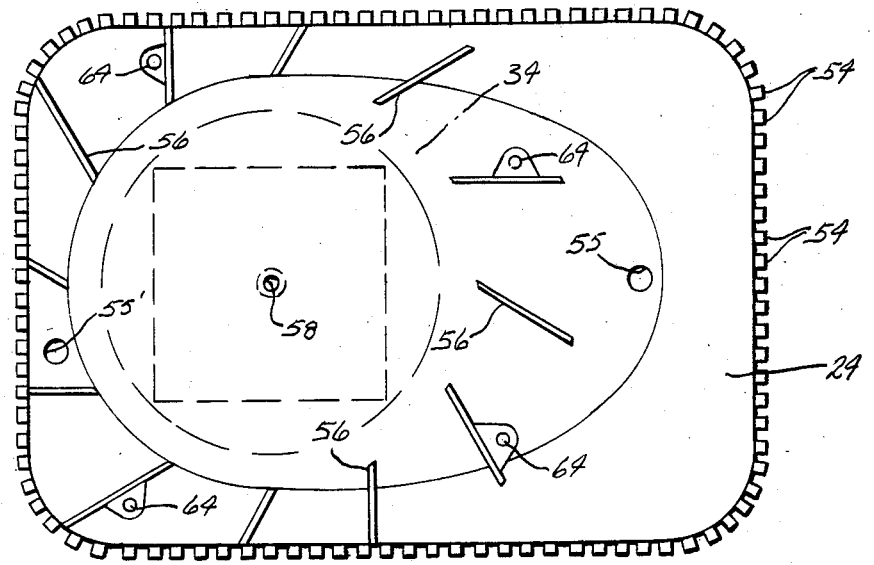
FIG. 4
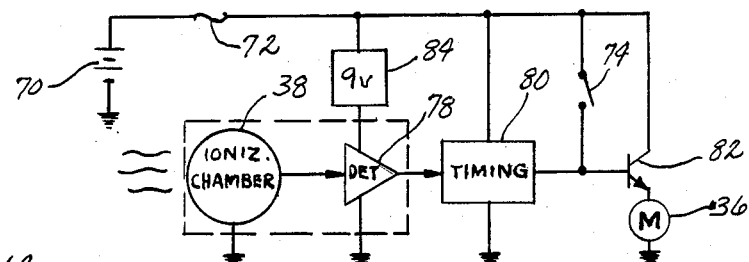
FIG. 6
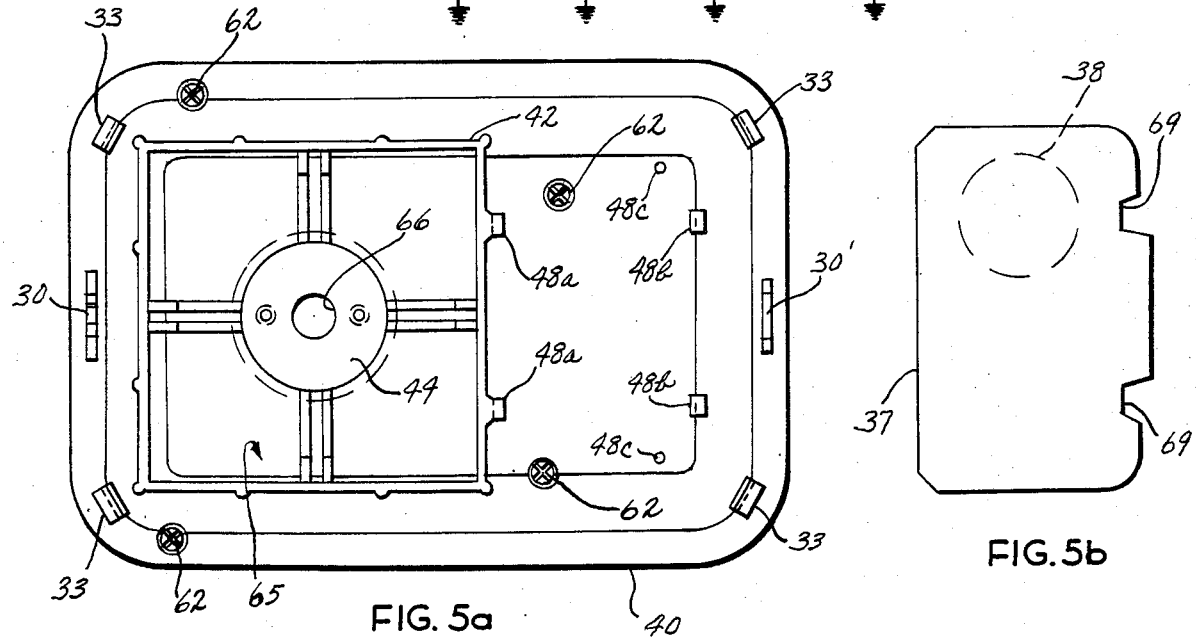
FIG. 5a
FIG. 5b

AUTOMATIC AIR PURIFIER FOR VEHICLES

BACKGROUND AND SUMMARY OF THE INVENTION

This invention relates to air purifiers and, more particularly, to an automatically operable air purifier for operation within the interior of a vehicle.

Passive smoking is the inhalation by nonsmokers of tobacco smoke of smokers. Credible scientific evidence has indicated that such smoking is dangerous to the health of nonsmokers. Further, recent research has indicated that a person's risk of developing cancer is higher if such person shares a living space with smokers. Societal pressures have, because of these hazards, developed against public smoking and against exposure of nonsmokers to tobacco smoke in the air. Research has also indicated that smoke inhaled through the air may have more of certain carcinogenic substances than what smokers inhale directly. A confined space which often exposes nonsmokers to forced passive smoking at high smoke levels is the interior of a vehicle. Thus, vehicular passengers are particularly at risk. For these reasons, it would be desirable to avoid smoking within a vehicle. Yet, it is impractical if not impossible, to prevent smoking within vehicles. Filtration of the air within a vehicle to remove smoke from the air appears to be a practical alternative and provides a method for protecting nonsmoking vehicular passengers.

It has been proposed heretofore to provide air filtering or purification within a vehicle. For example, Gilbertson U.S. Pat. No. 3,722,182 discloses an air purifying and deodorizing device for an automobile, including a filter and an electrostatic precipitator. An electronic air cleaner for vehicular use, also having an electrostatic precipitator as well as an ultraviolet sterilizing lamp is disclosed in Suzuki et al, U.S. Pat. No. 4,245,550. The apparatus disclosed in these patents is not well suited for being easily or quickly mounted at various locations within the vehicle, the device of U.S. Pat. No. 3,722,182 being required, for example, to be built into the structure of the car for placement of its components below a rear window deck, or front window deck or dashboard. A more serious shortcoming of such prior art constructions is that they do not respond automatically to the presence of smoke in the air. Their operation is operator dependent so that, unless operation were continuous, which is not desirable, a nonsmoker would have to voice a complaint to the driver or otherwise rely upon the driver being alert to the presence of smoke within the vehicle interior in order to be assured of operation. The risks, however, of smoke in the air to nonsmokers are great enough that one should not rely upon manual operation of a filter unit. Instead, its operation should be automatic.

Accordingly, among the several objects of the invention may be noted the provision of apparatus for purifying the air of a vehicle interior; which apparatus is self-contained, is extremely compact; which is efficient in operation; and which may be mounted or located at various possible places within a vehicle, including the ceiling of the vehicle, as well as being mountable to location upon a rear window shelf, a dashboard, or capable of being built-in within the vehicle.

A further object of the invention is the provision of such apparatus which is entirely automatic in operation, with operation commencing upon the detected presence of smoke within the vehicle interior and continuing for a predetermined interval after smoke is no longer detected, thereby to ensure that the air is free of smoke.

It is also an object of the invention to provide such air purification apparatus which protects the life and health of vehicle occupants by effectively and quickly eliminating smoke from the air and trapping it safely within a filter; and it is an object of the invention to provide such an air purifier which will clean and deodorize the air within the vehicle and so eliminates airborne dust and other contaminants.

Briefly, apparatus for air purification of the invention, as utilized for removing smoke from a confined space such as the interior of a vehicle, includes a housing for being located within the space at a location for removing smoke from the air, and a filter within the housing adapted for filtering of smoke. The housing also includes a fan for drawing air through the housing for smoke filtration by the filter, and an electric motor for driving the fan, as by being powered by the electrical system of the vehicle. Also positioned within the housing is circuitry, including a smoke detector, for causing operation of the motor upon detection of smoke in the air.

Other objects and features will be in part apparent and in part pointed out hereinbelow.

BRIEF DESCRIPTION OF THE DRAWINGS

FIG. 4 is a horizontal cross section as taken along line 4—4 of FIG. 3.

FIG. 5a and 5b together constitute separated elevation views of component parts of the air filtering apparatus, as taken generally along 5a—5a of FIG. 3.

FIG. 6 is a schematic circuit diagram of an electric circuit for operation of the new apparatus.

Corresponding reference characters indicated corresponding parts throughout the views of the drawings.

DESCRIPTION OF THE PREFERRED EMBODIMENT

Figure 1:
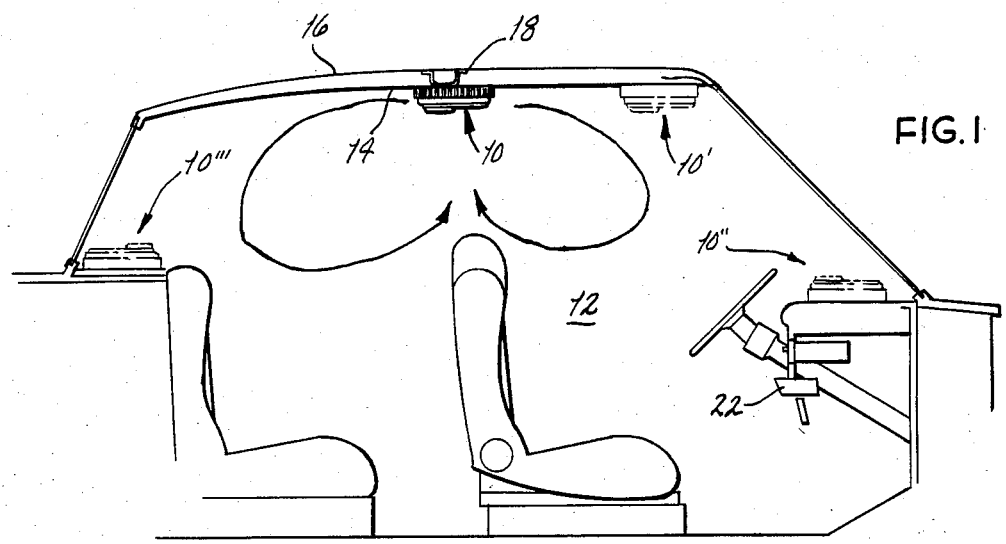
FIG. 1 is an elevation view, as taken longitudinally through a vehicle, for illustrating the placement of air filtering apparatus according to and embodying the present invention.

Referring to FIG. 1, reference character 10 generally designates an automatic air purifier of the invention, as shown mounted centrally within the passenger compartment 12 of a vehicle. The new air purifier may be mounted in a location centrally against the headliner 14 of the roof 16 of the vehicle. Thus, as shown, it may be located below a pre-formed support or stiffener 18 conventionally utilized in automobile construction as by being screwed to the support or by other mechanical means, or by use of adhesive.

This is but one of numerous possible mounting locations, but is particularly advantageous for purification of air including removing tobacco smoke from the air, by providing the air circulation pattern shown by arrows, with air being discharged laterally outwardly across headliner 14. In this position, air purifier 10 is well positioned for picking up air carrying tobacco smoke of passengers seated on either front seats or rear seats.

Other mounting locations are advantageous also. For example, the air purifier may be located in front of and above the front seat, as shown just rearwardly of the top of the windshield at 10'. It may also be located atop the dashboard, as at 10'', or in the rear package shelf as shown at 10'''. Of course, various built-in arrangements are also possible but, as an after market vehicle accessory, the foregoing placement locations are illustrative of various possibilities.

Figure 2:
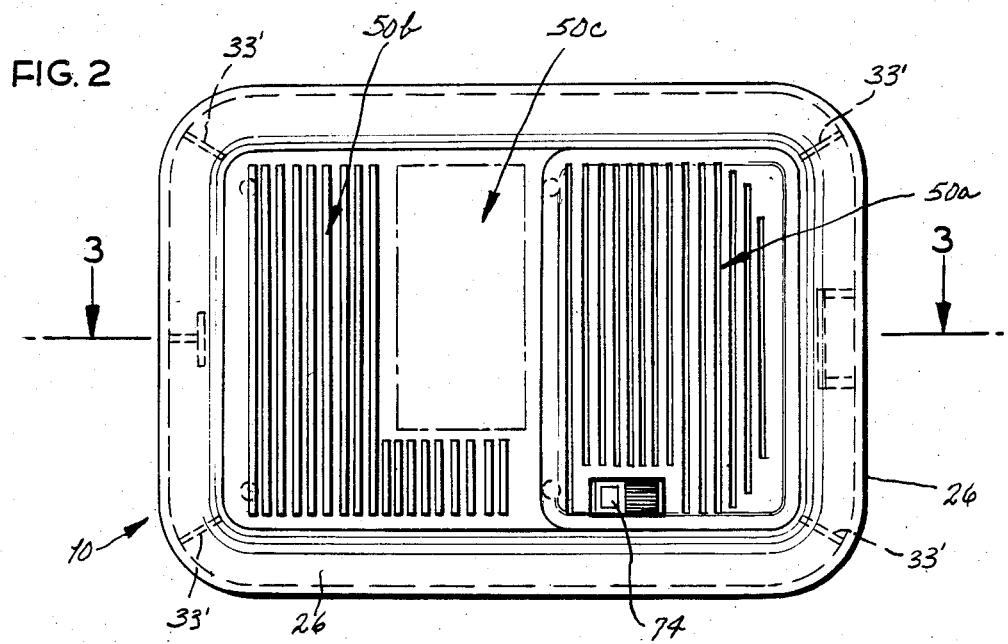
FIG. 2 is a plan view of the new apparatus, as taken exteriorly of a housing thereof.
Figure 3:
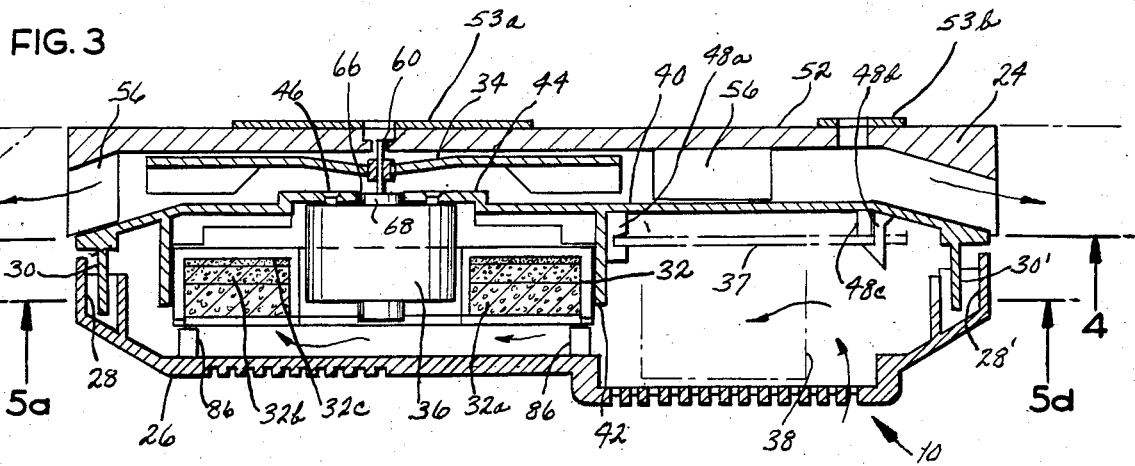
FIG. 3 is a longitudinal vertical cross section as taken generally along line 3—3 of FIG. 2.

Referring now to FIGS. 2 and 3, air purifier 10 includes a housing including a base 24 and a cover 26 which is configured for mating with base 24. Defined by the cover 26 are female location guide receptors 28, 28' for receiving corresponding male location guides 30, 30' extending outwardly from the base portion. These cooperating members locate and guide the cover 26 into position for securement to the base 24. Shown at 33 FIG. 5a) are suitable male tabs adapted for being received by corresponding female notch-defining projections 33' formed in the undersurface of cover 26 (FIG. 2). This arrangement permits the cover 26 to be snapped on or off a plate 40 when secured to base 24.

There is thus defined beneath cover 26 an internal space in which are contained a filter 32 for removing other contaminants from the air to be purified by unit 10, a fan 34 for drawing the air into a grill of cover 26 for smoke and other filtration by filter 32, an electric motor 36 for driving fan 34, and circuitry mounted upon a circuit board 37 including a smoke detector 38 for causing operation of motor 36 upon detection of smoke in the air.

Base 24 and cover 26 may be entirely formed of molded synthetic resin material. Carried by base 24 is a plate 40 which also maybe of synthetic resin material, and suitably mounted to base 24. Said plate 40 defines a filter mounting recess 42 in which is fitted filter 32 and includes also a centrally recessed portion 44 against which motor 36 is seated and secured, as by screws 46. Circuit board 37 is secured by engaging notches within lugs 48a at one edge and with the other edge being received within notches of latches 48b while supported by posts 48c. Members 48a, 48b and 48c are formed during the molding of plate 40.

Housing cover 26 is provided with slotted air intake openings across a right hand portion 50a. A left hand portion generally designated 50b is provided with ribs or dummy openings so that portion 50a serves alone for air intake for filtration by filter 32 and for detection of smoke in the air by smoke detector 38. A further region 50c without ribs permits application of a label plate or decal or the like. The arrangement by which air enters through slotted region 50a ensures that air intake will pass across smoke detector 38.

Smoke detector 38 may be of a conventional, commercially-available type such as heretofore utilized for smoke detection per se, as for alarm purposes, and is most preferably of the type in which smoke particles are ionized in a chamber by a small amount of radioactive material resulting in the establishment of an electron flow which can be detected and amplified for control purposes herein. Said smoke detector is connected in circuitry as shown in FIG. 6, as described below.

Referring to FIG. 4, base 24 is shown without said plate 40 having been installed. Extending upwardly from the bottom wall surface 52 of base portion 24 are a plurality of closely spaced ribs 54 which define between them openings for discharge of filtered air outwardly across a surface proximate the mounting location, it being observed that said rear wall 52 is of flat configuration but includes raised portions 53a, 53b to provide for securement by adhesive to a mounting location, such as headliner 14, a package shelf, or other ultimate location of the unit. Otherwise, the unit may be installed by screws extended through apertures through said rear wall 52, as at 55, 55' for affixing the unit to the desired location. It is preferred to cover aperture 55' (FIG. 4) with foil so that air being delivered by fan 34 will not escape through the aperture, but such foil is easily punctured by a screw or well nut if securement by such means is employed.

Further, said base portion has a plurality of upstanding weirs 56 (see also FIG. 3), which are so positioned relative to said elements 54 as to define a flow pattern for discharge of air from the fan. Further, weirs 56 also define a cylindrical recess for rotation of fan 34, which is overlayed in phantom in FIG. 4. It is noted also that base rear wall 52 also is provided with a central aperture 58 for location of the motor shaft 60 (FIG. 3) by which fan 34 is turned.

Referring to FIG. 5a, plate 40 is shown in greater detail. There, the filter recess-defining means 42 is shown to be formed of a rectangular series of walls, joined together at the corners with rectangular configuration to define a recess 65 in which the filter is readily seated and then retained by frictional fit, and by pressure exerted by supporting columns 86 of cover 26 when snapped in place.

Circuit board 37 is shown in FIG. 5b, removed from plate 40 to illustrate the configuration thereof, including notches 69 for receiving latch members 48b for securement. Sensor 38 is located at one end of the circuit board, the latter being provided with conventional circuit components, including resistors, capacitors, etc. (not shown) and providing part of the circuitry responding to sensor 38 when smoke is present.

Plate 40 is suitably affixed to base 24 by screws or the like, as illustrated at 62, as received within appropriate apertures 64 (FIG. 4) of the housing base. It is observed also that a central aperture 66 is provided in plate 40 for extension therethrough of the bushing 68 (FIG. 3) from which motor shaft 60 extends.

Referring now to FIG. 6, circuitry for powering the new purifier is illustrated. As shown, power is intended to be provided by the vehicular power system including a battery 70 and through an appropriate fuse 72. A manual switch 74 is provided, being located on the unit for access at one edge of cover 26, although it could be placed at a different location for driver control, etc. When closed, switch 74 permits power from the vehicle's electrical system to be provided to motor 36 independently of operation of smoke sensor 38. Sensor 38 is shown interconnected with a such as of commercially available type and operative to provide base drive to a transistor 82 for a predetermined time interval when timer operation is enabled by smoke sensor 38. According to the preferred mode of operation, said time delay circuit means 80 is reset for causing operation of motor 36 for a predetermined time interval, such as 3 minutes, preferably, upon detection of smoke in the air by smoke sensor 38. Most preferably, operation is such that time delay circuit 80 will be reset each time smoke is detected by smoke detector 38. Accordingly, as long as there is detection of smoke in the air, time delay circuit 80 will remain reset and whereby it will cause operation of motor 36 for the time delay interval following the last smoke detection in the air. Such operation ensures that all smoke will be purged from the vehicle interior and trapped within filter 32.

A 9-volt power supply circuit is used for providing much more suitable voltage to smoke detector circuit 78 for its proper operation, as designated at 84.

Referring to FIG. 3, filter 32 is comprised of multiple layers having different properties. A first layer 32a has resinous impingement fibers for entrapping relatively coarse airborne particles such as dust, dirt and pollen. Such fibers may be coated with a sticky substance to retain these and larger particles.

A thinner second filter layer 32b includes activated charcoal in pad form, being effective to absorb tobacco odor as well as other airborne odors.

Finally, a thin layer 32c is comprised of a wool fabric pad to remove submicron remnants of tobacco smoke as well as airborne pollutants of small size such as may escape through layer 32a. The fabric pad is coated to provide an electrostatic action for holding such remnants captured in the fabric.

Of course, the foregoing description of filter 32 does not limit the use of other materials including, without limitation, odor-absorbing or scent-emitting crystals to freshen or "sweeten" the processed air which is discharged by the unit.

Although receptacle 65 is dimensioned for causing filter 32 to fit tightly in place within receptacle 65, projections 86 as formed on the inner surface of cover 26 reliably retain filter 32 in place.

In operation, any presence of smoke in the vessel interior 12 is quickly detected by smoke detector 38. This causes operation of motor 36 to commence immediately and to remain in operation so long as any smoke is present, as well as to continue operating for the preset time delay interval following the last detection of smoke in the air. Since the air intake passes across the sensor 38, there is ensured the detection of any smoke entering the unit.

In the position illustrated in FIG. 1, unit 10 is strategically located for picking up smoke not only from the front seat passengers but also those in the rear seat of a vehicle and for quickly being drawn up into the unit. Fan 34 causes the air to be drawn inwardly in the direction normal to, i.e., toward the rear wall 52 of the housing base 24, and then to be directed out in a control pattern determined by weirs 56 for exiting across the headliner surface to provide the air circulation pattern illustrated. Other placements of the new air purifier are also advantageous. For example, unit 10' as located upon the vehicle dashboard, is situated for receiving smoke which may rise from an ashtray 22, while unit 10''' is well situated for entrapping smoke from rear seat passengers.

In view of the foregoing, it will be seen that the several objects of the invention and other advantages are achieved by the new construction which has been described.

Although the foregoing includes the description of the best mode of the embodiment contemplated for carrying out the invention, various modifications are contemplated.

As various modifications could be made in the construction herein described and illustrated without departing from the scope of the invention, it is intended that all matter contained in the foregoing description or shown in the accompanying drawing shall be interpreted as illustrative rather than limiting.

What is claimed is:

1. An automatic vehicular air purifier for automatically filtering out smoke and other airborne impurities within a vehicle passenger compartment, comprising:
   a housing including a base having a rear surface for being secured to a preselected location within the passenger compartment, said base defining a fan-receiving space for rotation of a fan, weirs surrounding the fan-receiving space for directing air outwardly therefrom, and outlet-defining means extending completely around the periphery of the base for discharge of the directed air;
   a plate for securement to the base in overlying relationship, said base including means for securement of the base to said location prior to securement of said plate to the base;
   an electric fan motor carried by the plate and having a fan blade being directed toward and received within the fan-receiving space with the motor being located outwardly from the blade, for rotation of the blade in a plane parallel to the base;
   the plate defining a filter receptacle concentric with respect to the fan blade and motor;
   a filter for being received by the filter receptacle, the filter being of multilayer construction and including a first layer for dust, dirt and particle filtration, an activated charcoal layer for odor filtration, and a further layer for submicron remnant filtration;
   a circuit board carried by the plate proximate the filter receptacle and circuit means on the circuit board including a smoke detector for causing operation of the motor by electric power provided by an electrical system of the vehicle in response to smoke in the air; and
   a cover configured for extending over and for covering the plate in overlying relationship to both the base and the plate, including means for securing the cover to the plate, the cover having an air intake for intake of air within the passenger compartment, the air intake being first exposed to the smoke detector and only thereafter to the filter for being drawn therethrough by the fan for filtration; the circuit means including time delay means for causing operation of the motor for a predetermined time interval beyond detection by the smoke detector of smoke in the air intaken; whereby the base may be first secured to said preselected location, and subsequently said plate secured to the base, and thereafter the cover secured over the plate.

2. An automatic air purifier according to claim 1, wherein said cover includes a first portion having the air intake, the smoke detector being located in close proximity to said first cover portion beneath the air intake, whereby the smoke detector will be exposed to air in the vehicle regardless of whether or not the fan is operating, and the cover includes a second portion without the air intake, the filter being beneath the second portion, whereby air to be filtered first must be drawn through the air intake and past the smoke detector before filtration.

3. An automatic air purifier according to claim 2, wherein the filter is retained within the filter receptacle by frictional fit.

4. An automatic air purifier according to claim 3, the cover including means urged against the filter when the cover is secured to the plate, for reliably retaining the filter in place within the receptacle.

5. An automatic air purifier according to claim 4, the base including raised portions providing areas for adhesive securement of the base to said preselected location.

6. An automatic air purifier according to claim 4, the raised portions having apertures for permitting alternative securement of the base to said preselected location by means of screws or the like, said apertures being covered by a puncturable layer of material normally preventing air delivered by the fan from escaping through the apertures but permitting puncturing by said screws or the like for securement.

7. An automatic air purifier according to claim 2, said time delay means is reset for causing operation as long as there is detection by the smoke detector of smoke in the air drawn into the air intake.

* * * * *